United States Patent
Moradi et al.

(10) Patent No.: US 10,284,581 B2
(45) Date of Patent: May 7, 2019

(54) SYSTEMS AND METHODS FOR DETECTING RESOURCES RESPONSIBLE FOR EVENTS

(71) Applicant: CAPITAL ONE SERVICES, LLC, McLean, VA (US)

(72) Inventors: Chris Moradi, San Francisco, CA (US); Jacob Sisk, Orinda, CA (US); Evan Bloom, Oakland, CA (US); Craig Gimby, Chesterfield, VA (US); Xin Sun, Dublin, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/856,614

(22) Filed: Dec. 28, 2017

(65) Prior Publication Data
US 2018/0191750 A1   Jul. 5, 2018

Related U.S. Application Data

(63) Continuation of application No. 15/854,030, filed on Dec. 26, 2017.
(Continued)

(51) Int. Cl.
*G06F 17/30* (2006.01)
*G06F 21/55* (2013.01)
(Continued)

(52) U.S. Cl.
CPC ...... *H04L 63/1416* (2013.01); *G06F 17/3053* (2013.01); *G06F 17/30991* (2013.01);
(Continued)

(58) Field of Classification Search
CPC .. G06Q 20/40; G06Q 20/401; G06Q 20/4016; G06Q 20/02; H04L 63/14;
(Continued)

(56) References Cited

U.S. PATENT DOCUMENTS 5,684,951 A   11/1997   Goldman et al.
7,523,016 B1   4/2009   Surdulescu et al.
(Continued)

FOREIGN PATENT DOCUMENTS

JP   2009 301207 A   12/2009

OTHER PUBLICATIONS

James F Reed II, Beter Binomial Confidence Intervals, 2007, Journal of Modern Applied Statistical Methos, vol. 6 Iss. 1, Article 15, pp. 153-161.*
(Continued)

*Primary Examiner* — Shanto Abedin
*Assistant Examiner* — Adrian Stoica
(74) *Attorney, Agent, or Firm* — Finnegan, Henderson, Farabow, Garrett & Dunner, LLP

(57) ABSTRACT

Systems and methods are disclosed for identifying resources responsible for events. In one embodiment, a method may include determining a number of unique actors in a plurality of actors that have accessed the resource. The method may further include identifying from the plurality of actors a set of affected actors that has been affected by an event and identifying from the set of affected actors a subset of resource-affected actors that accessed the resource prior to being affected by the event. The method may further include determining a number of resource-affected actors in the subset of resource-affected actors and, based on the number of unique actors and the number of resource-affected actors, determining an event score for the resource. The event score may be a lower bound of a confidence interval of a binomial proportion of the number of resource-affected actors to the number of unique actors.

12 Claims, 8 Drawing Sheets

Related U.S. Application Data

(60) Provisional application No. 62/440,949, filed on Dec. 30, 2016.

(51) Int. Cl.
| | |
|---|---|
| *G06F 21/60* | (2013.01) |
| *G06Q 20/40* | (2012.01) |
| *H04L 29/06* | (2006.01) |
| *H04W 12/12* | (2009.01) |
| *G06N 7/00* | (2006.01) |
| *G06Q 10/06* | (2012.01) |

(52) U.S. Cl.
CPC ............ *G06F 21/552* (2013.01); *G06F 21/60* (2013.01); *G06N 7/005* (2013.01); *G06Q 10/0635* (2013.01); *G06Q 20/4016* (2013.01); *H04L 63/1408* (2013.01); *H04L 63/1475* (2013.01); *H04W 12/12* (2013.01)

(58) Field of Classification Search
CPC ............ H04L 63/1408; H04L 63/1416; H04L 63/1441; H04L 63/1475; H04L 63/1483; G06F 21/60; G06F 21/62; G06F 21/6218; G06F 21/6245; G06F 21/50; G06F 21/52; G06F 21/54; G06F 21/55; G06F 21/552; G06F 17/30522; G06F 17/3053; G06F 17/30943; G06F 17/30991; H04W 12/08; H04W 12/12
See application file for complete search history.

(56) References Cited

U.S. PATENT DOCUMENTS

| | | | |
|---|---|---|---|
| 8,600,872 B1 | 12/2013 | Yan | |
| 2005/0055373 A1 | 3/2005 | Forman | |
| 2008/0172316 A1 | 7/2008 | Adams | |
| 2010/0130169 A1 | 5/2010 | Narayanaswamy et al. | |
| 2011/0131122 A1 | 6/2011 | Griffin | |
| 2012/0121618 A1 | 5/2012 | Kantoff et al. | |
| 2014/0279331 A1* | 9/2014 | Gimby ................ | G06Q 40/02 705/35 |
| 2015/0127805 A1 | 5/2015 | Htay et al. | |
| 2015/0163121 A1* | 6/2015 | Mahaffey ............ | G06F 11/0766 707/687 |
| 2017/0063905 A1* | 3/2017 | Muddu ............... | H04L 63/1425 |

OTHER PUBLICATIONS

Wallis, "Binomial confidence intervals and contingency test", Mathematical fundamentals and the evaluation of alternative methods. Journal of Quantitative Linguistic 20.3 (2013): 178-208.

Office Action, dated Apr. 14, 2018, for U.S. Appl. No. 15/854,030 (18 pages).

European Patent Office Search Report dated May 4, 2018, issued in corresponding European Application No. 17208869.2 - 1218, 8 pages.

\* cited by examiner

SYSTEMS AND METHODS FOR DETECTING RESOURCES RESPONSIBLE FOR EVENTS

CROSS-REFERENCE TO RELATED APPLICATIONS

This application is a continuation of U.S. application Ser. No. 15/854,030, filed Dec. 26, 2017, and claims priority to U.S. Provisional Application No. 62/440,949, filed on Dec. 30, 2016. Each of the above-referenced applications is expressly incorporated herein by reference in its entirety.

BACKGROUND

The discovery that a computer system has been compromised can occur well after the occurrence of the compromising event. The delay between the event and the discovery of compromise can make identifying the compromising event difficult, as many other innocuous events may have occurred since the compromising event. Furthermore, systems may have experienced a compromising event but may appear unaffected. For example, attackers may not exploit every occurrence of a compromising event, or may not yet have exploited an occurrence of a compromising event. So many computer systems may have been exposed to a compromising event, but only some may show signs of having been compromised.

For example, a webserver may have been hijacked to inject malicious code into the web browsers of users visiting a webpage hosted by the webserver. But by the time the malicious code is detected, the user may have visited web pages hosted by many other webservers, making identification of the hijacked webserver difficult. Even a security service having access records for numerous users may have difficulty identifying the hijacked webserver, because the webserver may be programmed to attempt the attack randomly, or the attack may depend on a user behavior or equipment configuration that is only intermittently present. Thus the webserver may not inject the malicious code into the web browser of every user that visits the webpage. Similarly, the malicious code may not be triggered immediately. So a security service may not know which web browsers are uninfected and which are infected, but yet to be triggered.

As a similar example, an ATM skimmer may be configured to store the account information of users that perform transactions at the ATM account. A criminal may later use this stored account information to perform unauthorized transactions. But during the time between the skimming of the account information and the unauthorized access, a user may visit several ATMs. Likewise the criminal may only perform unauthorized transactions in some of the accounts for which the ATM skimmer stored account information. As in the prior example, these factors may make it difficult to determine which ATM is compromised by a skimmer.

As another example, an unscrupulous merchant or employees of the merchant may acquire credit card information from customers during transactions that occur with the merchant. The acquired credit card information may later be used for unauthorized purchases. Given the delay between the unauthorized acquisition of credit card information and subsequent unauthorized purchases, it can be difficult to determine when the theft occurred and by whom. Many transactions with other merchants may precede the unauthorized use. Moreover, only a subset of the stolen credit card accounts may be subject to unauthorized purchases.

As shown in the above examples, a method for detecting events that compromise resources is provided. In a general case, it is desirable to determine a resource that is responsible for a given event. For example, when accounts are breached, it may be desirable to determine a database at which the breach occurred. As still another example, when financial account information is stolen and used without authorization, it may be desirable to determine a merchant or an automated teller machine (ATM) from which financial account information was skimmed or otherwise intercepted.

However, large-scale storage and exchange of electronic data poses a unique challenge for isolating resources that are responsible for events. In many cases, it is straightforward to determine a physical resource that is responsible for an event that affects physical actors. For example, a physical merchant is likely responsible for check fraud conducted using a physical check provided to the merchant. But with the advent of storage and exchange of electronic data, including the transmission of electronic data over networks such as the Internet, isolation of resources becomes more complex. An account found to have been breached may have been accessed through any number of channels. These channels may include one or more databases, financial institutions, and merchants, as well as any communication path between them. Therefore isolating where a security breach occurred among many electronic transactions has become very difficult. Moreover, monitoring large data sets in real-time provides unique problems.

Due to the continuous and complex exchange of electronic data in modern transactions, conventional systems may be unable to isolate specific resources in real-time in order to determine whether one resource over another is responsible for an event. By the time an event is detected, electronic data may have reached any number of resources, many of which may be separated in time and/or in geography from the event and/or from an affected actor (e.g., an account, a customer, and/or a financial card). Conventional systems may therefore be unable to determine the resource responsible for the event.

SUMMARY

The disclosed embodiments may include systems and methods for detecting resources responsible for events.

In one embodiment, a system is disclosed. The system may include a memory storing instructions and a processor configured to execute the instructions to perform operations. The operations may include receiving data associated with a resource and, based on the data associated with the resource, identifying a plurality of actors that have been used to access the resource; based on the plurality of actors, determining a number of unique actors that have accessed the resource; identifying from the plurality of actors a set of affected actors, where each affected actor has been affected by an event; identifying from the set of affected actors a subset of resource-affected actors, the subset including each affected actor that accessed the resource prior to the event; determining a number of resource-affected actors in the subset of resource-affected actors; based on the number of unique actors and the number of resource-affected actors, determining an event score for the resource; and based on the event score, determining whether the resource is responsible for the event. The event score may be a lower bound of a confidence interval of a binomial proportion of the number of resource-affected actors to the number of unique actors.

In another embodiment, a method is disclosed. The method may include identifying a plurality of actors that have accessed a resource; based on the plurality of actors, determining a number of unique actors that have accessed the resource; identifying from the plurality of actors a set of affected actors, where each affected actor has been affected by an event; identifying from the set of affected actors a subset of resource-affected actors, the subset including each affected actor that accessed the resource prior to the event; determining a number of resource-affected actors in the subset of resource-affected actors; based on the number of unique actors and the number of resource-affected actors, determining an event score for the resource. The event score may be a lower bound of a confidence interval of a binomial proportion of the number of resource-affected actors to the number of unique actors.

In yet another embodiment, a non-transitory computer-readable medium is disclosed. The computer-readable medium may store instructions that, when executed by a processor, cause the processor to perform operations. The operations may include identifying a plurality of actors that have accessed a resource; based on the plurality of actors, determining a number of unique actors that have accessed the resource; identifying from the plurality of actors a set of affected actors, where each affected actor has been affected by an event; identifying from the set of affected actors a subset of resource-affected actors, the subset including each affected actor that accessed the resource prior to the event; determining a number of resource-affected actors in the subset of resource-affected actors; based on the number of unique actors and the number of resource-affected actors, determining an event score for the resource. The event score may be a lower bound of a confidence interval of a binomial proportion of the number of resource-affected actors to the number of unique actors.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

The disclosed systems, methods, and media may be configured to detect resources that are responsible for events. A resource may be responsible for an event, for example, when the event occurred at the resource, when the resource caused the event, and/or when the resource was used to cause the event.

Resources may include any physical or electronic resource, such as a database, a server, a computing device, an entity, a network, a location or branch, an automated teller machine (ATM), a website, a mobile application, a merchant, or a financial service provider. Other resources are possible as well. Events may include any occurrence, such as a security breach, unauthorized data access, an instance of fraud, or a change in customer behavior (e.g., an increase in customer purchases, a decrease in customers opening accounts, a change in customer traffic to a website, etc.). Alternatively or additionally, events may include events indicative of any of the foregoing. For example, an event may be an event indicative of a database or system breach, such as misuse of login credentials or data retrieved from the breached database or system. For instance, use of financial card data that was stored at a database may be indicative of a breach at the database, while a hacked email address or account that was stored at a system (e.g., at a website at which the email address or account was registered) may be indicative of a security breach at the system (e.g., at the website). Other events are possible as well.

The disclosed systems, methods, and media, unlike conventional systems, may detect a resource that is responsible for an event based on electronic data associated with actors. Actors may include people, such as users or customers, and/or physical or electronic objects, such as financial cards or accounts. Other actors are possible as well. The disclosed systems, methods, and media may, based on the electronic data associated with the actors, identify a resource responsible for an event, model a potential for an event at a resource, and/or provide a graphical user interface illustrating a potential for an event at a resource. Through a specific method of aggregating and scoring bulk electronic data (e.g., transaction data associated with a merchant, etc.), the disclosed embodiments can effectively isolate and identify events, reducing fraud and improving security of electronic transactions.

Figure 1:
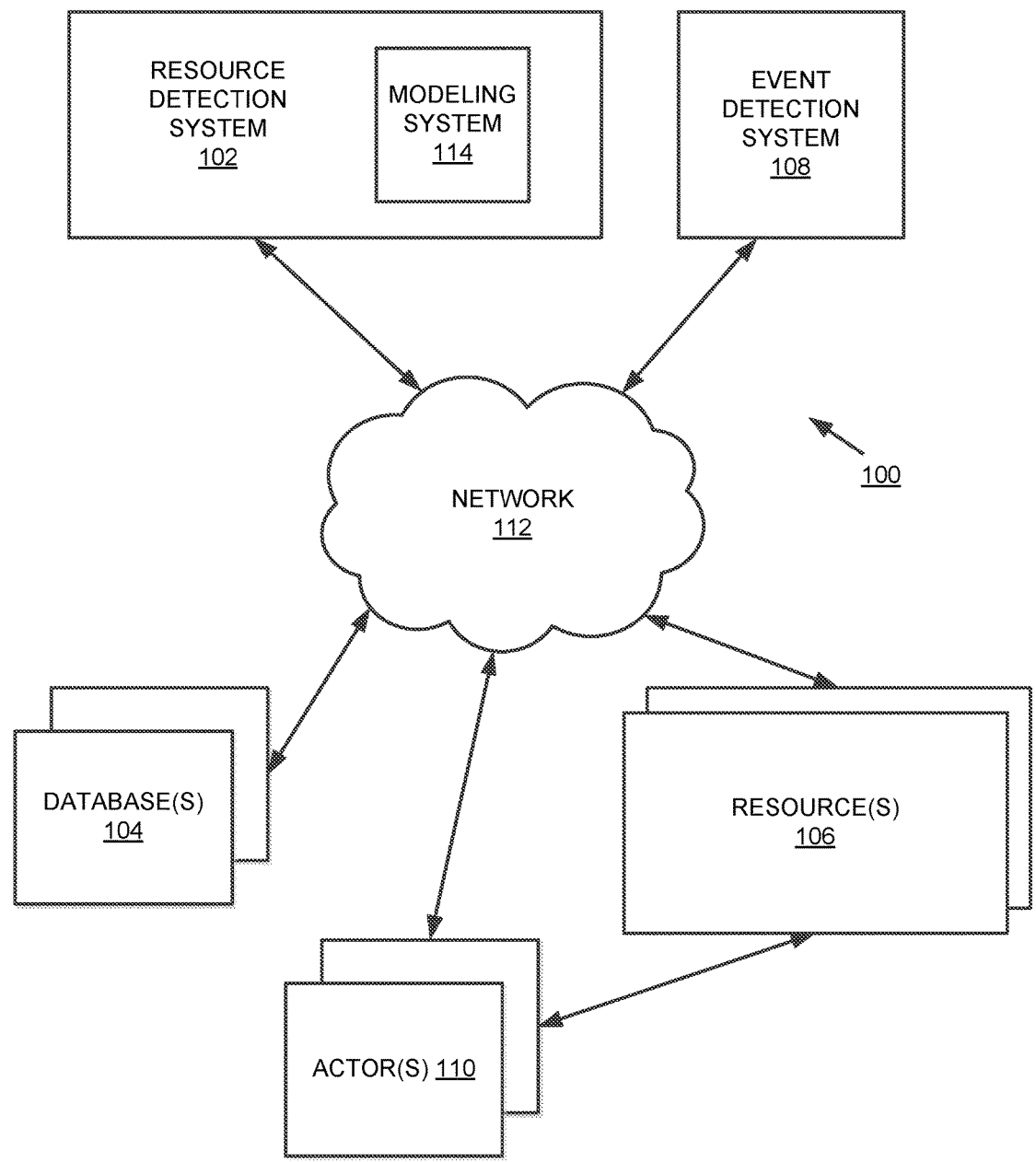
FIG. 1 is a block diagram of an example system, consistent with disclosed embodiments.

FIG. 1 is a block diagram of an example system 100, consistent with disclosed embodiments. System 100 may be used to detect resources that are responsible for events, consistent with disclosed embodiments. System 100 may include a resource detection system 102, database(s) 104, resource(s) 106, an event detection system 108, and actor(s) 110, all of which may be communicatively coupled by a network 112.

While only one resource detection system 102 and event detection system 108 are shown, it will be understood that system 100 may include any number of either of these components. Further, while multiple database(s) 104, resource(s) 106, and actor(s) 110 are shown, it will be understood that system 100 may include any number of either of these devices or entities as well. The components and arrangements of the components included in system 100 may vary. Thus, system 100 may include other components that perform or assist in the performance of one or more processes consistent with disclosed embodiments.

Resource detection system 102 may include one or more computing systems configured to perform one or more operations consistent with detecting that any of resource(s) 106 are responsible for an event. Events may include any occurrence, such as a security breach, an instance of fraud, or a change in behavior. Other events are possible as well, as described above. For example, in a system for detecting financial card fraud, the resource(s) 106 may include merchants, ATMs, and/or other physical or electronic resources. As another example, in a system designed to detect a database responsible for an account breach, the resource(s) 106 may include databases or other physical or electronic resources.

Actor(s) 110 may include any device or entity configured to access resource(s) 106, either directly or via network 112. Actor(s) 110 may include, for example, people, such as users or customers, and/or physical or electronic objects, such as financial cards or accounts. Other actor(s) 110 are possible as well. For example, in a system for detecting financial card fraud, the actor(s) 110 may include financial cards and/or accounts or users associated with financial cards. As another example, in a system designed to detect a database involved in/responsible for an account breach, the actor(s) 110 may include accounts and/or computing devices or users associated with accounts.

In particular, resource detection system 102 may be configured to receive data associated with resource(s) 106. For example, resource detection system 102 may receive data associated with resource(s) 106 from database(s) 104 and/or from another source, such as local or remote data storage, flat text files, cloud storage, volatile storage, and/or non-volatile storage. Based on the data associated with the resource(s) 106, the resource detection system 102 may be configured to determine an event score for each resource 106. The event score may indicate a likelihood that a resource 106 is responsible for an event. Resource detection system 102 is further described below in connection with FIG. 2.

In some embodiments, resource detection system 102 may include a modeling system 114. Modeling system 114 may be may be one or more computing devices configured to perform operations consistent with generating models illustrating events traceable to resource(s) 106. The models may illustrate, for example, the event scores at resource(s) 106, such as variations in the event scores over time. In some embodiments, the models may take the form of a graphical user interface. Example modeling system 114 graphical user interfaces are further described below in connection with FIGS. 5A-5B.

While modeling system 114 is shown included in resource detection system 102, in some embodiments modeling system 114 may be a stand-alone system and/or may be integrated with and/or connected to one or more of database(s) 104, resource(s) 106, and event detection system 108

Database(s) 104 may be one or more computing devices configured to perform operations consistent with storing data associated with resource(s) 112, events, and/or actor(s) 110. Database(s) 104 may include, for example, Oracle™ databases, Sybase™ databases, or other relational databases or non-relational databases, such as Hadoop™ sequence files, HBase™, or Cassandra™. Database(s) 104 may include computing components (e.g., database management system, database server, etc.) configured to receive and process requests for data stored in memory devices of the database(s) and to provide data from the database(s).

Data associated with resource(s) 106 and/or actor(s) 110 may include, for example, historical data identifying access by actor(s) 110 to resource(s) 106. Data identifying access by actor(s) 110 to resource(s) 106 may include, for example, an identification of the actor 110, a description of the access, and/or a date and/or time of access. For example, in a system for detecting financial card fraud, the data may include data describing financial cards and/or accounts or users associated with financial cards, transactions conducted using the financial cards, financial fraud affecting the financial cards, and/or merchants or ATMs at which the financial cards were used. As another example, in a system designed to detect a database responsible for account breach, the data may include data describing accounts and/or computing devices or users associated with accounts, access by the accounts to databases, unauthorized use of or access to the accounts, and/or databases accessed by the accounts For example, data may include authorizations on financial cards used to make purchases at resource(s) 106, which may include systems associated with merchants. A financial card may be, for example, associated with a financial service account, such as a bank card, key fob, or smartcard. For example, a financial card may comprise a credit card, debit card, loyalty card, or any other financial services product. In some embodiments, a financial card may comprise a digital wallet or payment application. A financial card is not limited to a card configuration and may be provided in any form capable of being configured to perform the functionality of the disclosed embodiments. In some embodiments, a financial card may include or be included in a mobile device, any wearable item, including jewelry, a smart watch, or any other device suitable for carrying or wearing on a customer's person. Other financial cards are possible as well. Data identifying financial cards used to make purchases at merchant(s) may include, for example, dates on which the purchases were made at merchant(s) and customers associated with the financial cards.

In some embodiments, data associated with resource(s) 106 may further include data describing resource(s) 106. Data describing resource(s) 106 may include, for example, data identifying a brand or operator of resource(s) 106, data identifying a resource type of resource(s) 106 (e.g., server, database, merchant, service provider, etc.), data identifying a geographic location of resource(s) 106, data describing any point-of-sale terminals associated with resource(s) 106 (e.g., geographic location of terminal, terminal manufacturer, terminal hardware, terminal software, etc.), data describing security used by resource(s) 106, and/or data describing a processor 108 used by resource(s) 106 (e.g., processor operator, processor hardware, processor software, etc.). Other data describing resource(s) 106 is possible as well.

While database(s) 104 are shown separately, in some embodiments database(s) 104 may be included in or otherwise related to one or more of resource detection system 102, event detection system 108, and resource(s) 106.

Database(s) 104 may be configured to collect and/or maintain the data associated with resource(s) 106, actor(s) 110, and/or events and provide it to the resource detection system 102. Database(s) 104 may collect the data from any number of sources, including, for instance, resource(s) 106, event detection system 108, and/or third-party systems (not shown). Other sources of data are possible as well. Database(s) 104 are further described below in connection with FIGS. 3A-3C.

In some embodiments, instead of database(s) 104, system 100 may include other storage, whether volatile or nonvolatile, at which data is stored and from which data can be accessed by resource detection system 102. Such storage may be included in, accessible by, and/or associated with one or more of resource detection system 102, resource(s) 106, event detection system 108, and/or one or more third-party systems (not shown).

When an actor 110 accesses a resource 106, the resource 106 and/or another entity may collect and/or maintain data identifying the actor 110 that has accessed the resource 106. Additionally, the resource 106 and/or another entity may collect and/or maintain data describing the access and/or data identifying a date on which the access was made. The resource 106 may collect and/or maintain other data as well. Data collected and/or maintained by resource(s) 106 may be provided to database(s) 104, other storage, resource detection system 102, and/or event detection system 108. For example, in a system for detecting financial card fraud, when a financial card is used to conduct a transaction at a merchant or ATM, the merchant, ATM, and/or another entity may collect and/or maintain data describing the financial card, the ATM or merchant, and the transaction, such as a date on which the financial card was used to make the transaction. As another example, in a system designed to detect a database responsible for account breach, when an account accesses a database, the database and/or another entity may collect and/or maintain data describing the account, the database, and the access, such as a date on which the access occurred.

Event detection system 108 may be one or more computing devices configured to perform operations consistent with detecting events at resource(s) 106 and/or among actor(s) 110. In particular, event detection system 108 may be configured to receive data associated with resource(s) 106 and/or actor(s) 110 from resource(s) 106, database(s) 104, and/or other storage. Based on the data associated with the resource(s) 106 and/or actor(s) 110, event detection system 108 may be configured to detect events. In particular, event detection system 108 may be configured to generate data associated with resource(s) 106 and/or actor(s) 110 that identifies affected actor(s) 110, each of which has been affected by an event. Data may further identify a date on which the event affecting the actor 110 occurred. Data generated by event detection system 108 may be provided to database(s) 104, other storage, resource(s) 106, and/or resource detection system 102. For example, in a system for detecting financial card fraud, when a financial card experiences fraud, data may be generated that describes the financial card and the fraud, such as a date on which the fraud occurred. As another example, in a system designed to detect a database responsible for account breach, when an account is breached (e.g., experiences unauthorized use or access), data may be generated that describes the account and the breach, such as a date on which the breach occurred.

While event detection system 108 is shown separately, in some embodiments event detection system 108 may be included in or otherwise related to one or more of resource detection system 102, database(s) 104, and resource(s) 106.

Network 112 may include any type of network configured to provide communications between components of system 100. For example, network 112 may include any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
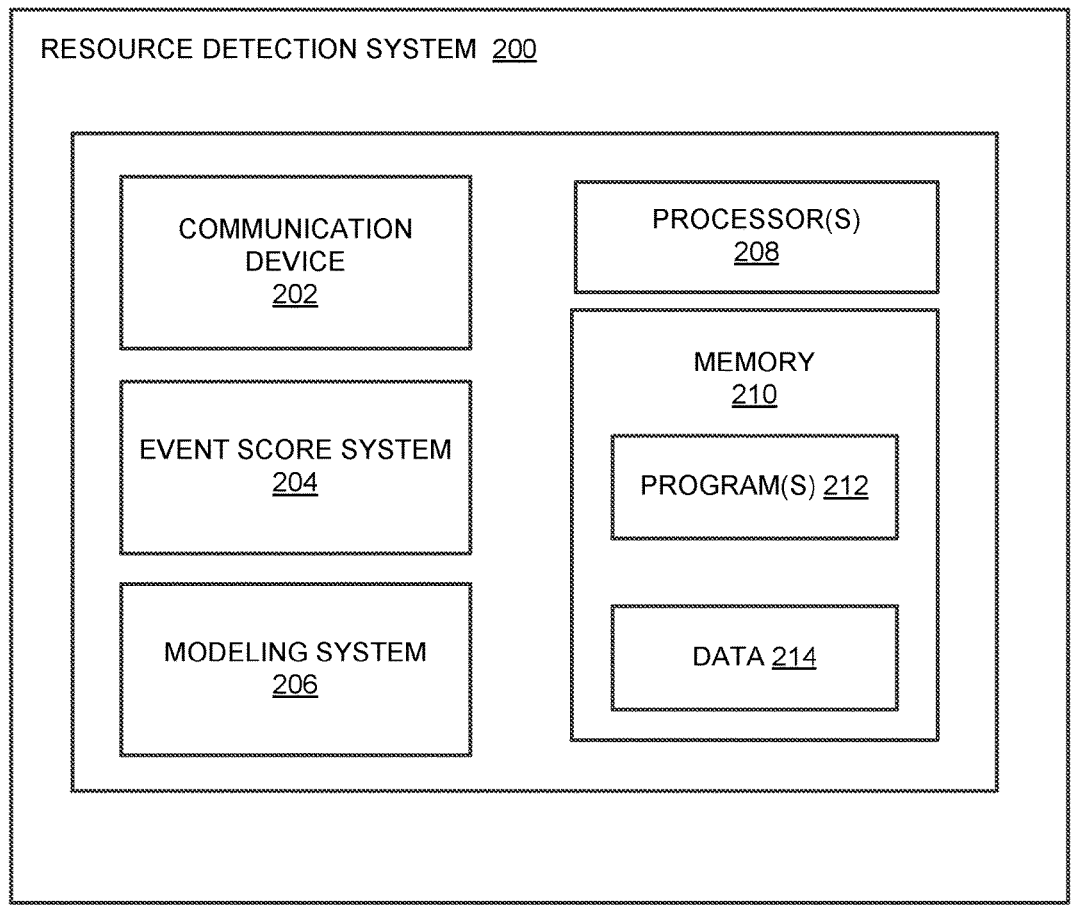
FIG. 2 is a block diagram of an example resource detection system, consistent with disclosed embodiments.

FIG. 2 is a block diagram of an example resource detection system 200, consistent with disclosed embodiments. As shown, resource detection system 200 may include a communication device 202, an event score system 204, a modeling system 206, one or more processor(s) 208, and memory 210 including one or more program(s) 212 and data 214. In some embodiments, resource detection system 102 can include or be implemented using a resource detection system such as resource detection system 200.

In some embodiments, resource detection system 200 may take the form of a server, general purpose computer, mainframe computer, or any combination of these components. Other implementations consistent with disclosed embodiments are possible as well.

Communication device 202 may be configured to communicate with one or more database(s) or other storage, such as database(s) 104 described above. In some embodiments, communication device 202 may be configured to receive from the database(s) and/or other storage data associated with resources, actors, and/or events.

Communication device 202 may be configured to communicate with other components as well, including, for example, one or more event detection systems, such as event detection system 108 described above. For example, communication device 202 may be configured to receive from an event detection system data associated with resources, actors, and/or events.

Communication device 202 may include, for example, one or more digital and/or analog devices that allow communication device 202 to communicate with and/or detect other components of resource detection system 102, such as a network controller and/or wireless adaptor for communicating over the Internet. Other implementations consistent with disclosed embodiments are possible as well.

Event score system 204 may be configured to determine event scores for resources based on the data associated with the resources, events, and/or actors received by the resource detection system 200. Event scores are further described below in connection with FIG. 4.

In some embodiments, resource detection system 200 may include a modeling system 206. Modeling system 206 may include one or more computing devices configured to perform operations consistent with generating models illustrating a likelihood that resources are responsible for events. While this is discussed in terms of a resource being responsible for an event, the system may equally be used to provide a figure of merit for a resource being responsible for an actor, an actor being responsible for an event or a resource, or an event being responsible for an actor or a resource. As such, the likelihoods of responsibility, quantified as figures of merits, can be compared between events, between actors, or between resources, as relevant to the then ongoing analysis, to identify a most likely source of/for an outcome and/or to establish a threshold to evaluate whether an outcome has occurred.

Modeling system 206 may be configured to generate, based on the data associated with the resources, events, and/or actors received by the resource detection system 200 and the event scores determined by event score system 204, models illustrating a likelihood that resources are responsible for events. The models may illustrate, for example, the event scores of the resources, such as variation in the event scores over time. In some embodiments, the models may take the form of graphical user interfaces configured to receive input from users and generate displays. Example graphical user interfaces are further described below in connection with FIGS. 5A-5B.

Processor(s) 208 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands of different components of resource detection system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. The disclosed embodiments are not limited to separate programs or computers configured to perform dedicated tasks. For example, memory 210 may include a single program 212 that performs the functions of resource detection system 200, or program(s) 212 may comprise multiple programs. Memory 210 may also store data 214 that is used by program(s) 212.

In certain embodiments, memory 210 may store sets of instructions for carrying out the processes described below in connection with FIG. 4. In certain embodiments, memory 210 may store sets of instructions for generating the graphical user interfaces described below in connection with FIGS. 5A-5B. Other instructions are possible as well. In general, instructions may be executed by processor(s) 208 to perform one or more processes consistent with disclosed embodiments.

The components of resource detection system 200 may be implemented in hardware, software, or a combination of both hardware and software, as will be apparent to those skilled in the art. For example, although one or more components of resource detection system 200 may be implemented as computer processing instructions, all or a portion of the functionality of resource detection system 200 may be implemented instead in dedicated electronics hardware.

Figure 3A:
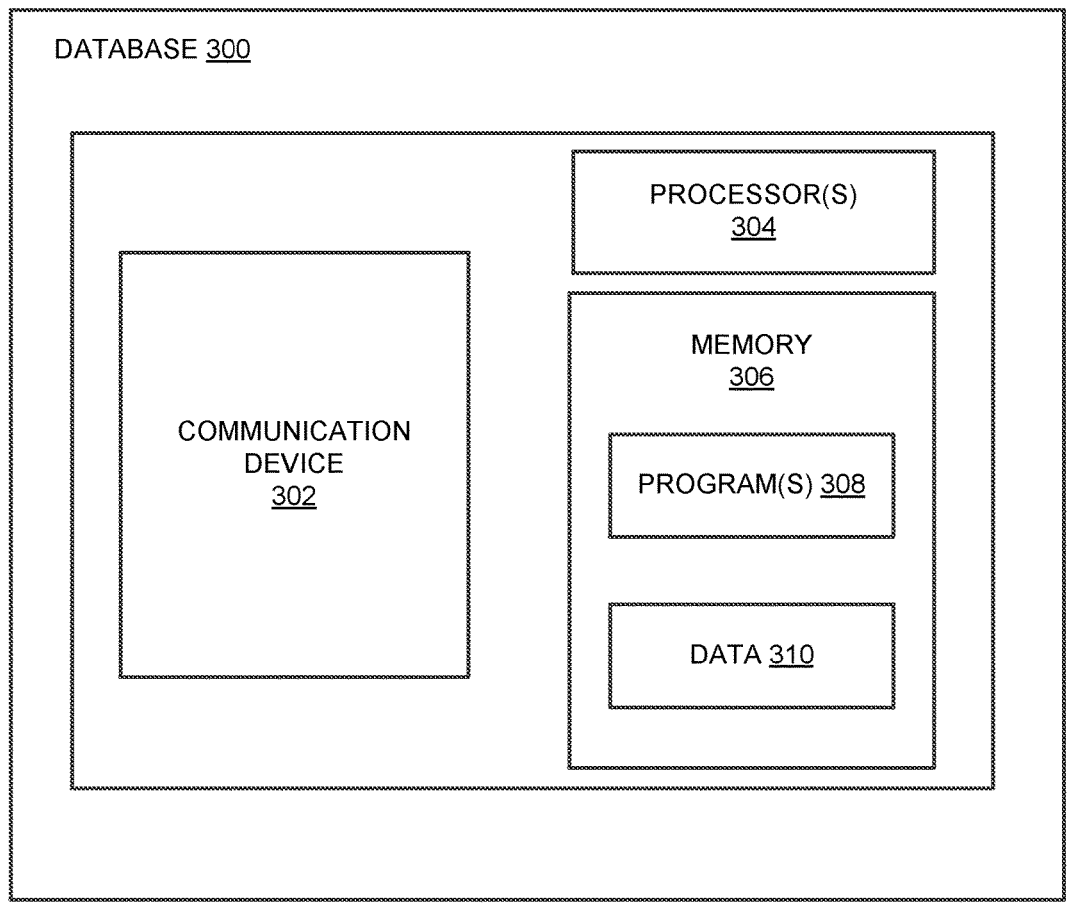
FIGS. 3A-3C are example block diagrams illustrating an example database and data, consistent with disclosed embodiments.
Figure 3B:
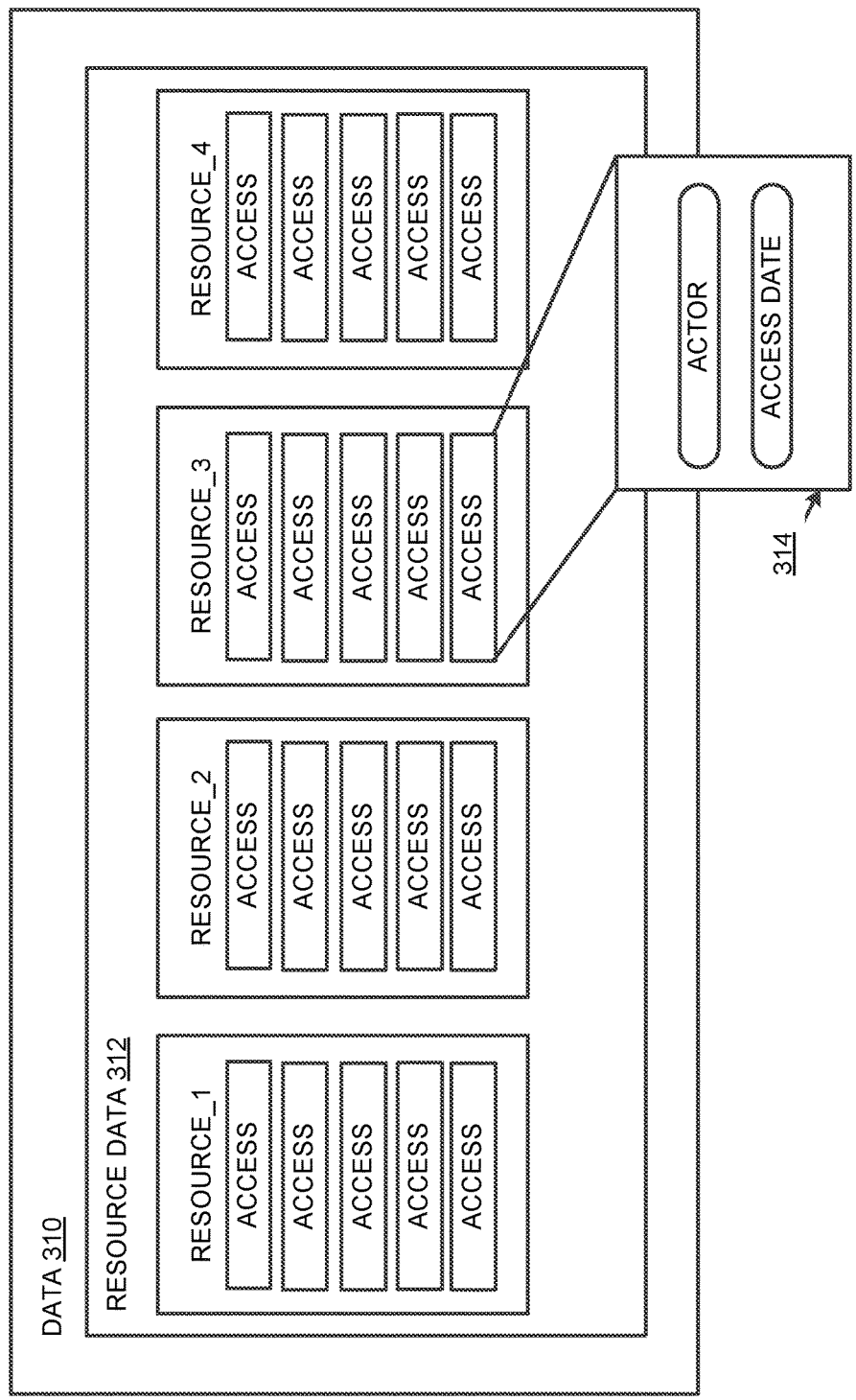
Figure 3C:
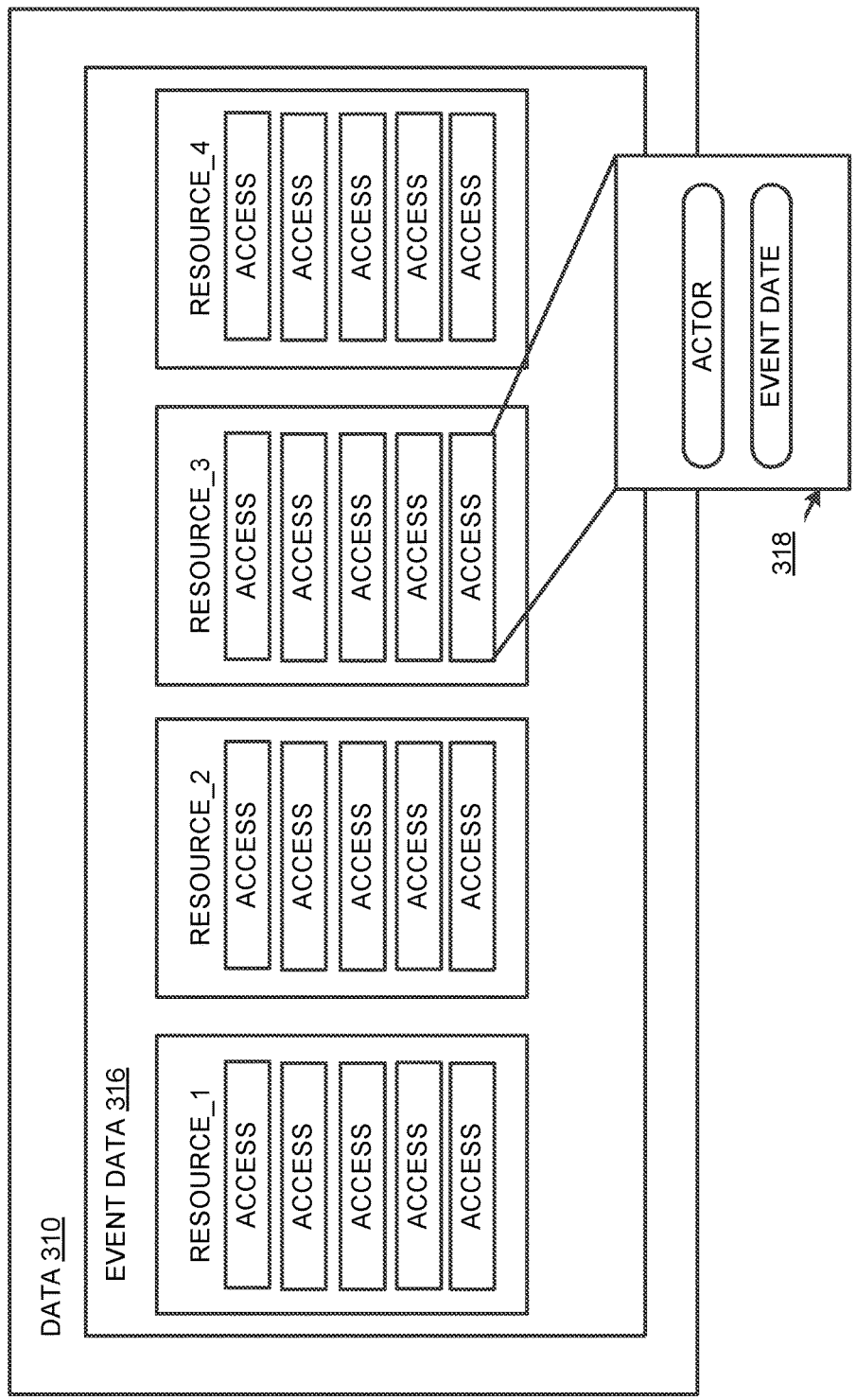

FIGS. 3A-3C are example block diagrams illustrating an example database 300 and data 310, consistent with disclosed embodiments. As shown in FIG. 3A, database 300 may include a communication device 302, one or more processor(s) 304, and memory 306 including one or more program(s) 308 and data 310. Database 300, in some embodiments, may be implemented identically to one or more of database(s) 104, described above in connection with FIG. 1.

In some embodiments, database 300 may take the form of a server, general purpose computer, mainframe computer, or any combination of these components. Other implementations consistent with disclosed embodiments are possible as well.

Communication device 302 may be configured to communicate with one or more resource detection systems, such as resource detection systems 102 and 200 described above. In particular, communication device 302 may be configured to provide to the resource detection system(s) data associated with a number of resources, actors, and/or events. Alternatively, in some embodiments the resource detection system(s) may store data locally and/or receive data from one or more other entities.

Communication device 302 may be configured to communicate with other components as well, including, for example, one or more event detection systems, such as event detection system 108 described above. Communication device 302 may take any of the forms described above for communication device 202.

Processor(s) 304, memory 306, program(s) 308, and data 310 may take any of the forms described above for processor(s) 208, memory 210, program(s) 212, and data 214, respectively. The components of database 300 may be implemented in hardware, software, or a combination of both hardware and software, as will be apparent to those skilled in the art. For example, although one or more components of database 300 may be implemented as computer processing instructions, all or a portion of the functionality of database 300 may be implemented instead in dedicated electronics hardware.

Data 310 may be data associated with a number of resources, such as resource(s) 106 described above, actors, and/or events. Data 310 may include, for example, resource data 312, as shown in FIG. 3B. Resource data 312 may describe access to resources by actors.

As shown, resource data 312 may include data corresponding to access by actors made at resources, such as "Resource_1," "Resource_2," etc. For each access 314, resource data 312 may identify an actor that accesses the resource and an access date indicating a date on which the actor accessed the resource. For example, in a system designed to detect a merchant responsible for financial card fraud, resource data 312 for the merchant may identify the financial card and/or a user or account associated with the financial card used to make a purchase at the merchant and a date on which the financial card was used to make a purchase at the merchant. As another example, in a system designed to detect a database responsible for an account breach, resource data 312 for the database may identify the account (and/or a user associated with the account) that accessed the database and when this account (and/or associated user) accessed the database. One of skill in the art would recognize that this example is not intended to be limiting.

Data 310 may further include, for example, event data 316, as shown in FIG. 3C. Event data 316 may describe events affecting actors accessing the resource.

As shown, event data 316 may include data corresponding to events affecting actors accessing resources, such as "Resource_1," "Resource_2," etc. For each access corresponding to an event, event data 316 may identify an affected actor and an event date indicating a date on which the actor was affected by the event. For example, in a system designed to detect an automated teller machine (ATM) responsible for the skimming of financial card data, event data 316 for the ATM may identify the financial card and/or a user or account associated with the financial card used at the ATM and a date on which the financial card was used at the ATM. One of skill in the art would recognize that this example is not intended to be limiting.

While data 310 is shown to have a particular organization or structure, it will be understood that this organization or structure is merely illustrative. Other organizations and structures of data 310 are possible as well. For example, in some embodiments, resource data 312 and/or event data 316 may be stored together, separately, in another database, elsewhere in the same database 300, and/or in another storage medium. As another example, in some embodiments, resource data 312 and/or event data 316 may describe other aspects of actors, events, and/or resources.

Figure 4:
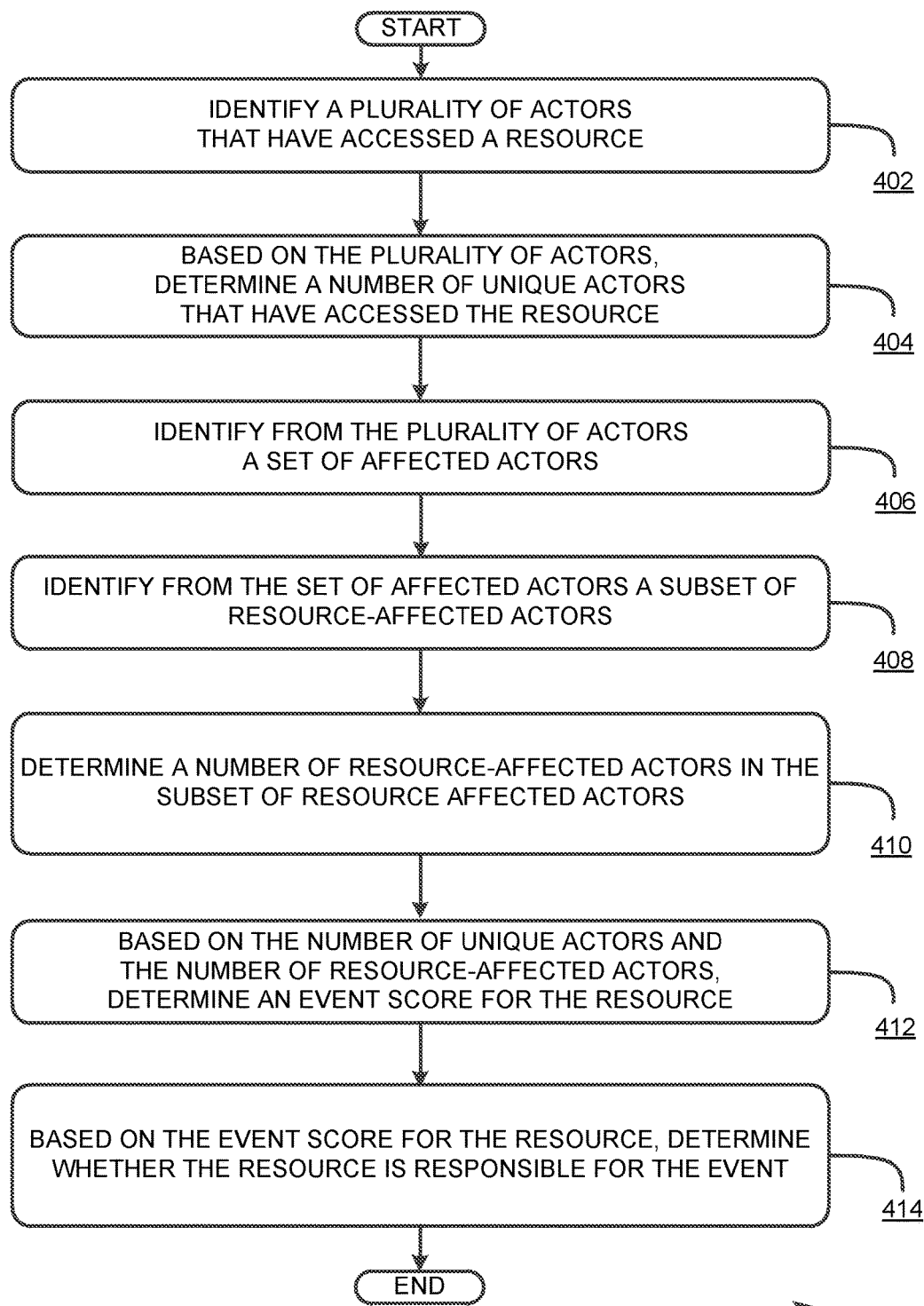
FIG. 4 is an example flow chart illustrating a resource detection process, consistent with disclosed embodiments.

FIG. 4 is an example flow chart illustrating a resource detection process 400, consistent with disclosed embodiments. Resource detection process 400 may be carried out, for example, by a resource detection system, such as resource detections systems 102 and 200 described above.

As shown, resource detection process 400 begins at step 402. In step 402, a resource detection system can identify a plurality of actors that have accessed a resource. The plurality of actors may be identified based on, for example, data associated with the resource received by the resource detection system. The data associated with the resource may be received by the resource detection system from a database, such as database(s) 104 and 300 described above. The data associated with the resource may be received from elsewhere as well.

In some embodiments, at least one aspect of the actors identifies the actors as a group for which it is desired to determine whether some event or resource biased an outcome. For example, where a group of individual actors is known to have been victimized by credit card fraud, that group of actors may form the seed group for evaluating events or resources to determine the likelihood of an event or resource being the source of the credit card fraud. Alternatively, analysis can be undertaken on hypothetical groups as seeds, to evaluate whether credit card fraud is on-going whether detected or not, by comparison of the quantitative likelihoods of events or resources being the source of the credit card fraud, i.e., by the quantitative measure for that entity exceeding a threshold.

While FIG. 4 is discussed with respect to testing an outcome wherein the process is seeded by a group of actors, the process can be equally seeded using a group of events, or a group of resources. Furthermore, and similar to seeding via actors, analysis can be seeded based on a hypothetical group, to determine if an outcome is occurring, rather than based on knowledge of the outcome actually occurring, as a result of consideration of quantitative scoring.

Finally, although actors and events have been identified as process seeds above, resources can also be used as process seeds. For example, initial consideration may be based on a group of resources, either resources for which an outcome has already happened or for which it is desired to hypothetically test the group to determine if an outcome is happening.

In some embodiments, the data associated with the resource received by the resource detection system may include resource data, such as resource data 312 described above. The resource detection system may identify the plurality of actors by, for example, identifying the actors that have accessed the resource, such as with access 314. The resource detection system may identify the plurality of actors that have been used to access the resource in other manners as well.

For example, in a system for detecting financial card fraud at a merchant, the plurality of actors may include financial cards and/or users or accounts associated with the financial card used to make a purchase at the merchant, as indicated by, for example, resource data, such as resource data 312. The resource data may, for example, identify the financial card, user, and/or account and a date on which the financial card was used to make a purchase at the merchant. As another example, in a system designed to detect a database responsible for account breach, the plurality of actors may include accounts and/or users associated with accounts used to access the database as indicated by, for example, resource data, such as resource data 312. The resource data may, for example, identify the accounts and/or users used to access the database and a date on which the account was used to access the database The resource detection process 400 continues at step 404 where, based on the plurality of actors, the resource detection system may determine a number of "unique actors" that have accessed the resource. In some embodiments, the number of unique actors may be equal to a number of actors accessing the resource (as well as the number of accesses to the resource). For example, if x different accounts accessed a database at y different times, the number of unique accounts may be equal to the number of accounts x (as well as the number of accesses y). Alternatively, in some embodiments, a number of unique actors may be smaller than a number of accesses to the resource. For example, x different computing devices may have accessed an ATM y different times, where y is greater than x due to multiple accesses by the same computing device(s). Still alternatively, a number of unique actors may be smaller than a number of actors accessing the resource. For example, if x different financial cards belonging to y different people have accessed an ATM, the number of unique actors may be the number of different people y, rather than the number of financial cards x, since multiple financial cards x may be traceable to the same user y. The number of unique actors may be determined based on, for example, data associated with the resource received by the resource detection system. Alternatively or additionally, the number of unique actors may be estimated based on, for example, historical numbers. In some embodiments, the data associated with the resource received by the resource detection system may include resource data, such as resource data 312 described above. The number of unique actors may, for example, be less than a number of actors that have accessed the resource, as some actors may have accessed the resource more than one time. In some cases, an actor may access a resource in two or more ways. For example, in a system for detecting financial card fraud at a merchant, a user may use two or more financial cards to make purchases at a single merchant. In these cases, the number of unique actors may be less than a number of actors that have accessed the merchant because some actors may have accessed the resource in more than one way. The resource detection system may determine the number of unique actors that have accessed the resource in other manners as well. In step 406, the resource detection system may identify from the plurality of actors identified in step 402 a set of affected actors. The affected actors may include, for example, actors that have been affected by an event. The affected actors may be identified based on, for example, data associated with the resource received by the resource detection system.

In some embodiments, the data associated with the resource received by the resource detection system may include event data, such as event data 316 described above. The resource detection system may identify a plurality of affected actors by, for example, identifying all affected actors in the event data, such as event 318. For example, in a system for detecting financial card fraud at a merchant, the resource detection system may identify financial cards and/or users or accounts associated with the financial card affected by financial card fraud based on event data, such as event data 318. The event data may indicate, for example, which financial cards experienced fraud. As another example, in a system designed to detect a database responsible for account breach, the resource detection system may identify accounts and/or users associated with accounts that have experienced unauthorized access or use.

The plurality of affected actors in the event data and the plurality of actors identified in step 402 may then be compared to identify the set of affected actors. In particular, actors appearing in both in the plurality of affected actors in the event data and the plurality of actors identified in step 402 may make up the set of affected actors. The resource detection system may identify the set of affected actors in other manners as well. For example, in a system for detecting financial card fraud at a merchant, the affected actors may include financial cards that both were used to make a purchase at a merchant and experienced financial card fraud. As another example, in a system designed to detect a database responsible for account breach, the affected actors may include accounts and/or users associated with accounts that both were used to access the database and experienced unauthorized access or use.

The resource detection process 400 continues at step 408 where the resource detection system may identify from the set of affected actors identified in step 406 a subset of resource-affected actors. The subset of resource-affected actors may include actors affected by an event that can possibly be traced back to the resource. To this end, the resource detection system may compare, for each affected actor in the set of affected actors, a first date of access with an event date. The first date of access may be the earliest date on which the actor accessed the resource. The resource detection system may determine the first date of access for each actor by, for example, identifying the access date for each access, such as access 314, made by the actor at the resource. For example, in a system for detecting financial card fraud at a merchant, the first date of access may be the first date on which the financial card was used to make a purchase at the merchant. As another example, in a system designed to detect a database responsible for account breach, the first date of access may be the first date on which the account was used to access the database.

The resource detection system may determine the first date of access for each actor in other manners as well. The event date may be the earliest date on which the actor was affected by the event. The resource detection system may determine the event date for each affected actor by, for example, identifying the event date for each access associated with an event, such as access 318, made by the actor at the resource. For example, in a system for detecting financial card fraud at a merchant, the event date may indicate the first date on which a financial card experienced fraud. As another example, in a system designed to detect a database responsible for account breach, the event date may indicate the first date on which an account experienced unauthorized access or use.

The subset of resource-affected actors may include affected actors that accessed the resource prior to the event. In this manner, actors affected by the event before accessing the resource may be excluded from the subset of resource-affected actors, as an event cannot be traced back to the resource for affected actors affected by the event prior to accessing the resource. For example, in a system for detecting financial card fraud at a merchant, the resource-affected actors may include financial cards and/or users or accounts associated with the financial card that were used to make a purchase at the merchant before being affected by financial card fraud. As another example, in a system designed to detect a database responsible for account breach, the resource-affected actors may include accounts and/or users associated with accounts that accessed the database before experiencing unauthorized access or use. The subset of resource-affected actors may be determined in other manners as well. The resource detection system may determine a number of resource-affected actors in the subset of resource-affected actors at step 410.

In some embodiments, resource detection process 400 may be carried out in real-time. For example, resource detection process 400 may be carried out in real-time using an estimated number of unique actors and/or resource-affected actors. Alternatively, resource detection process 400 may be carried out in real-time using a calculated number of unique actors and/or resource-affected actors. Real-time calculation of a number of unique actors and/or resource-affected actors may vary by application, a number of resources being monitored, and/or a number of actors being monitored. In some embodiments, for example, a database may be used to store data indicating which resources an actor has accessed, as well as any events affecting the actor. Each time data describing an event is received, all resources accessed by the actor may be identified, and an event score for each resource may be calculated to account for the described event. To facilitate the real-time detection and scoring, the database may take the form of, for example, an event-based database (e.g., a RethinkDB database) or another database. Alternatively or additionally, in some embodiments an in-memory database (e.g., a Redis database) may be used in place of a persistent database, which reduces data retrieval time from traditional persistent databases. Moreover, a probabilistic data structure (e.g., a bloom filter) may be used to store, for each actor, an indication of a probability that the actor has accessed each resource. Such a probabilistic data structure may be configured to operate more efficiently than data structures that operate using "yes/no" determinations of whether an actor accessed a particular resource, instead using "maybe/no" determinations. Bloom filters can be more space-efficient than standard hash table structures, facilitating faster inserts and look-ups and thus supporting real-time monitoring of data. While a Bloom filter may return false positives (e.g., overcounting affected actors), its efficiency can facilitate real-time monitoring of events. Moreover, the disclosed embodiments can be configured to reduce the chance of false positives to a small probability such that the benefits of the efficiency of the Bloom filter outweigh the drawbacks of any errors. Event scores may then be calculated in real-time each time data describing an event is received, as described above. Furthermore, in some embodiments multiple systems may be used to monitor each resource and/or a subset of resources, either in series (e.g., each system monitoring a unique subset of all resources) or in parallel (e.g., systems monitoring overlapping subsets of all resources). For example, only a subset of total resources may be monitored in order to conserve processing power and/or for efficiency.

At step 412, the resource detection system may determine, based on the number of unique actors and the number of resource-affected actors, an event score for the resource. The event score may be calculated as a real-time metric that may indicate a potential that the resource is responsible for the event. For example, in a system for detecting financial card fraud at a merchant, the event score may indicate a potential that the merchant is responsible for the financial card fraud. As another example, in a system designed to detect a database responsible for account breach, the event score may indicate a potential that database is responsible for the unauthorized access or use. In some embodiments, the event score may be a quantitative score, such as a numeric value or rating. Alternatively or additionally, the event score may be a qualitative score, such as an alphabetic grade or rating. For example, the event score may indicate a potential that the resource is responsible for the event along on a numeric scale, a high-medium-low rating, or an A-F grading system. Other event scores are possible as well.

The resource detection system may determine the event score using, for example, a binomial confidence interval. In particular, the event score may be determined based on a lower bound of a binomial confidence interval.

For an occurrence observed in a proportion p of a sample n, a binomial confidence interval can establish a margin of error around the observed proportion p that theoretically includes the actual proportion of the sample n. An error level α of the binomial confidence interval reflects how certain it is that the actual proportion falls within the binomial confidence interval. The binomial confidence interval may be given by, for example, the Wald Interval:

$$(p-z_{\alpha/2}\cdot\sigma, p+z_{\alpha/2}\cdot\sigma)$$

where $z_{\alpha/2}$ is the critical value of the normal distribution for the error level α, and σ is the standard deviation of the sample n, given by:

$$\sqrt{p(1-p)/n}.$$

For example, consider an observed proportion p of resource-affected actors in a number of unique actors n. The binomial confidence interval establishes a margin of error around the observed proportion p of resource-affected actors that includes the actual proportion of resource-affected actors in the number of unique actors n. An error level α of the binomial confidence interval reflects how certain it is that the actual proportion falls within the binomial confidence interval. For example, for an error level α of 0.05, the binomial confidence interval reflects a theoretical 95% certainty that the actual proportion of resource-affected actors falls within the binomial confidence interval.

In some embodiments, a binomial confidence interval may be determined using the lower bound of a Wilson Score. The Wilson Score for a proportion p of resource-affected actors in a number of unique actors n is given by:

$$\left(p + \frac{z_{\alpha/2}}{2n} - z\alpha/2 \sqrt{\frac{p(1-p)}{n} + \frac{z_\alpha^2/2}{4n^2}}\right) / \left(1 + \frac{z_\alpha^2/2}{n}\right).$$

Alternatively or additionally, in some embodiments, a binomial confidence interval may be determined using the lower bound of a Clopper-Pearson interval. The Clopper-Pearson interval considers a number of instances x observed in a sample n. For example, a Clopper-Pearson interval may consider a number of resource-affected actors x observed in the number of unique actors n. The lower bound of the Clopper-Pearson interval is given by:

$$\frac{x}{x + (n - x + 1)F}$$

where F is the $F_{v_2, 1-\alpha/2}{}^{v_1}$ quantile with $v_1=2n-2x+2$ and $v_2=2x$ degrees of freedom.

While the Wald interval, Wilson Score, and Clopper-Pearson interval have been described, it will be understood that other confidence interval determinations are possible as well, including, without limitation, the Jeffreys interval and the Agresti-Coull interval. Other confidence intervals are possible as well.

Using the lower bound of a binomial confidence interval to determine the event score can have several benefits. First, the event score can depend on the fraction of actors accessing a resource that have been affected by an event, rather than the number of actors. In this manner, the binomial confidence interval better accounts for variations in actor volume among resources. Second, a binomial confidence interval can produce reliable event scores for resources with small actor volumes, because the event score can reflect evidence of downstream events when such evidence rises to the level of statistical significance. Other benefits exist as well.

In some embodiments, the number of resource-affected actors may be a simple count or sum of the plurality of resource-affected actors. Alternatively, in some embodiments, the number of resource-affected actors may be a weighted sum of the plurality of resource-affected actors, with actors being weighted according to the proportion of accesses by the actor that were made at the resource (as compared to other resources). For example, an actor for which a low proportion of accesses were made at the resource may be weighted less than an actor for which a high proportion of accesses were made at the resource, in order to account for the increased likelihood for the latter actor that the event is traceable to the resource. The number of resource-affected actors may be determined in other manners as well.

In some embodiments, the event score may be given by the lower bound of a binomial confidence interval. For example, the event score may take a numeric value given by the lower bound of the binomial confidence interval. Alternatively or additionally, the event score may take a quantitative or qualitative value that corresponds to the lower bound of the binomial confidence interval. For example, the event score may take a value along a numeric range, such as a range from 0-1 or 1-100. As another example, the event score may take a qualitative value indicating a rating, such as "high," "medium," or "low." As still another example, the event score may take a qualitative value indicating a grade, such as an "A-" or "C+." Other event scores are possible as well.

While the foregoing described carrying out resource detection process 400 in connection with a single resource, it will be understood that the resource detection process 400 can be carried out for a plurality of resources in order to determine an event score for each resource. In some embodiments, the event scores for the resources may reflect, for example, a ranking of the resources. Further, in some embodiments, resource detection process 400 may be carried out for a predetermined period, such that the first date of access is the earliest date on which an actor accessed the resource within the predetermined period and/or the event date is the earliest date on which an actor was affected by the event within the predetermined period. The resource detection process 400 may be carried out for a plurality of predetermined periods. The predetermined periods may be sequential and/or overlapping. In this manner, event scores for a plurality of resources over a plurality of predetermined periods may be determined.

In some embodiments, based on resource detection process 400, the resource detection system may take action to limit and/or promote future events based on the event scores. For example, in some embodiments the resource detection system may identify at least one resource in the plurality of merchants as responsible for the event based on the at least one resource's event score. For instance, the resource detection system may identify as responsible and/or further investigate any resource having an event score that exceeds a predetermined threshold. Alternatively or additionally, the resource detection system may identify as responsible and/or further investigate any resource having an event score that has increased by more than a predetermined amount, for example, within a predetermined period. The resource detection system may identify resources as responsible in other manners as well.

In some embodiments, the resource detection system may, for any resource identified as responsible, flag each actor in the plurality of actors. Alternatively or additionally, the resource detection system may employ the event scores to determine whether actors are affected by events in the future. For example, if an actor has accessed a resource identified as responsible for an event, a subsequent access by the actor may be flagged. For instance, in a system designed to detect a merchant responsible for financial card fraud, if a financial card has been used to make a purchase at a merchant determined to be responsible for the fraud, the financial card may be flagged. Subsequent purchases made using the financial card may, for example, be screened and/or declined.

In some embodiments, the resource detection system may aggregate event scores for an actor by, for example, summing or otherwise combining event scores for each resource accessed by the actor within a predetermined period. In some embodiments, the actor may be flagged based on the aggregated event scores. For instance, in a system designed to detect a merchant responsible for financial card fraud, the resource detection system may, for example, flag, reissue, and/or decline incoming authorizations for purchases on the financial card when the aggregated event scores exceed a predetermined threshold and/or increases by more than a predetermined amount, for example, within a predetermined period. The resource detection system may take other actions as well.

In some embodiments, resource detection process 400 may further include, for example, estimating gains and/or losses from events, estimating dates on which events may have occurred at resources, identifying additional actors that may be affected by an event in the future, and/or predicting future activity by affected actors and/or future events. These estimates may, in some embodiments, be used in connection with the predetermined thresholds and/or rankings described above. For instance, the resource detection system may identify as responsible and/or further investigate any resource having an event score that exceeds a predetermined threshold based on gains and/or losses or any resource having the highest ranking and/or a ranking above a certain cutoff.

In some embodiments, the event scores for the plurality of resources during the plurality of predetermined periods may be provided to a modeling system. The modeling system may be configured to generate, based on data associated with the resources received by the resource detection system and the events scores models illustrating a potential for events at the resources. The models may illustrate, for example, the event scores at the plurality of resources, such as variation in the event scores over predetermined periods. In some embodiments, the models may take the form of graphical user interfaces configured to receive input from users and generate displays. Example graphical user interfaces are further described in connection with FIGS. 5A-5B.

Figure 5A:
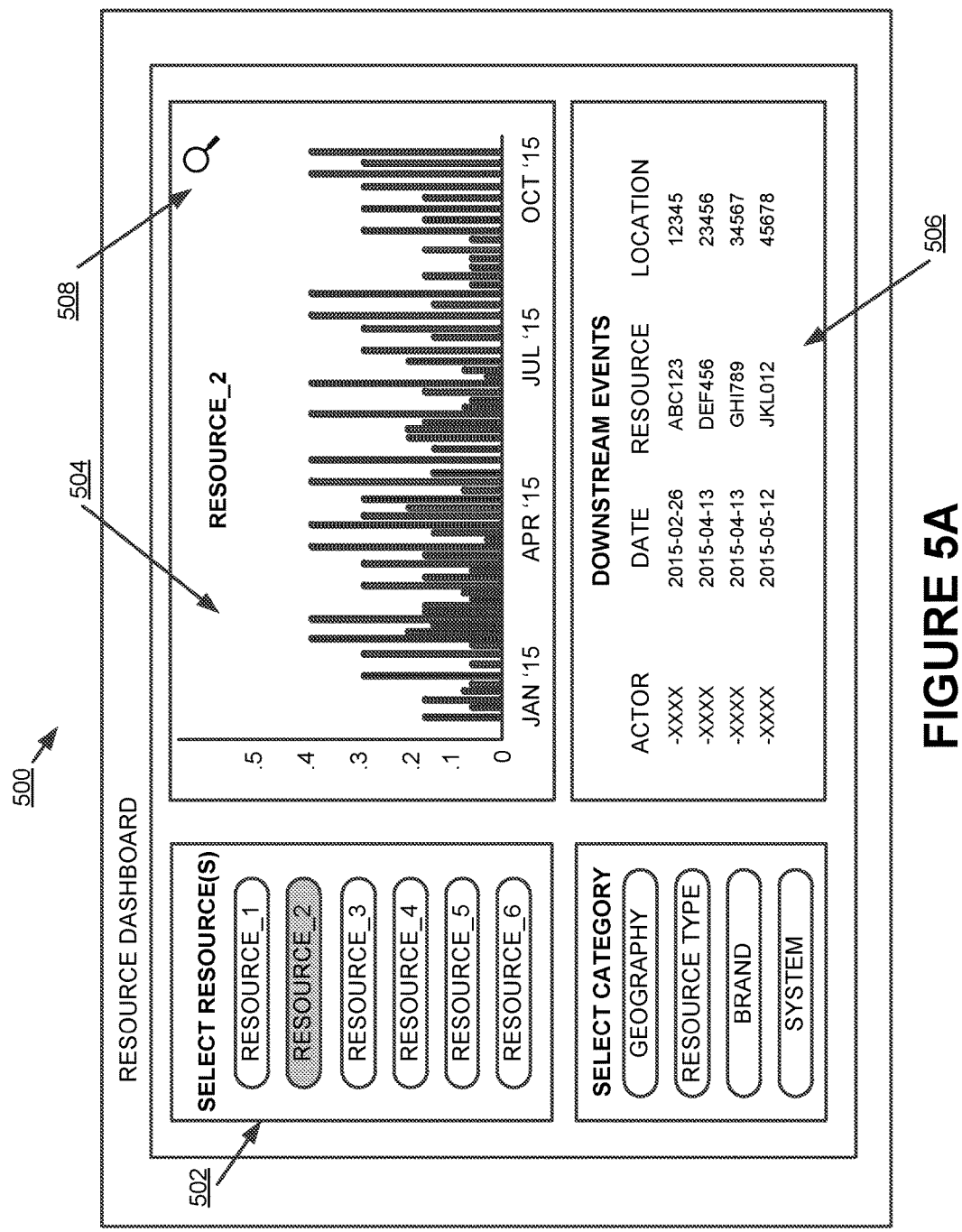
FIGS. 5A-5B illustrate example modeling system graphical user interfaces, consistent with disclosed embodiments.
Figure 5B:
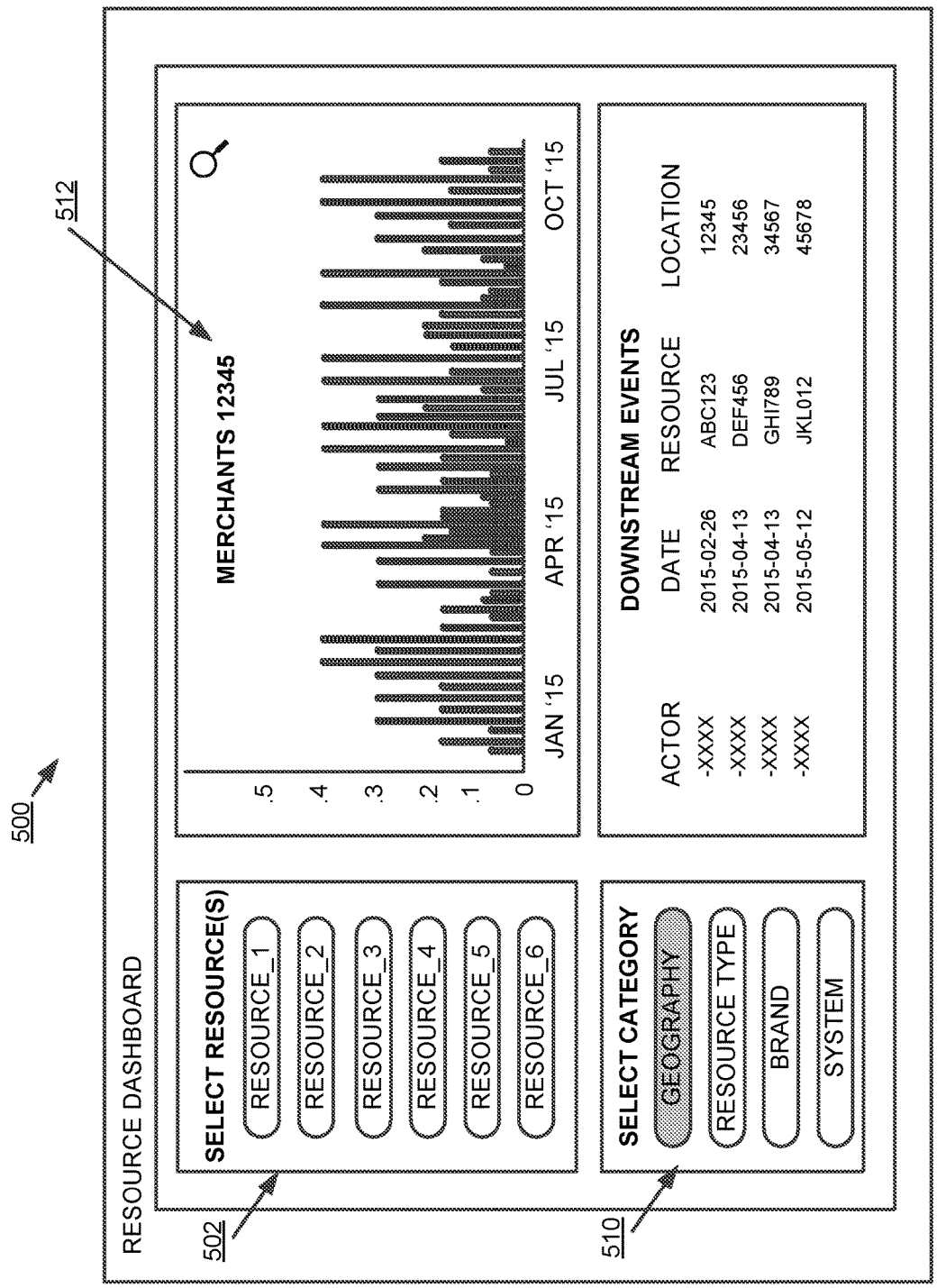

FIGS. 5A-5B illustrate example modeling system graphical user interfaces, consistent with disclosed embodiments. As shown, an example graphical user interface 500 may identify resources 502, event scores 504, and downstream events 506. The resources 502 may be, for example, the plurality of resources for which event scores are determined using resource detection process 400 described above. For example, as shown, the plurality of resources may include six resources ("RESOURCE_1," "RESOURCE_2," etc.). Any number of resources, including a single resource, is possible.

The resources and events depicted in graphical user interface 500 may vary by application of resource detection process 400. For example, in a system for detecting an ATM at which financial data has been skimmed, the resources may include ATMs and the events may include fraudulent use of skimmed financial data. As still another example, in a system for detecting a merchant at which financial card fraud originated, the resources may include merchants (e.g., locations, branches, servers, websites, and/or mobile applications associated with merchants) and the events may include instances of financial card fraud. As yet another example, in a system for detecting a database at which accounts have been breached, the resources may include databases (and/or entities responsible for the databases) and the events may include unauthorized access to or use of the accounts. Other examples are possible as well.

In some embodiments, a user of graphical user interface 500 may select a resource from the resources 502 to view the resource's event scores. For example, as shown, "RESOURCE_2" is selected. As shown, the event scores 504 for the resource may be displayed for one or more predetermined periods. In some embodiments, an event score 504 may be determined every one or more days, weeks, years, or other predetermined periods. Each determined event score 504 may be displayed on graphical user interface 500, or event scores 504 may be aggregated for display on graphical user interface 500. The event scores 504 and/or aggregated event scores may be shown, for example, over the course of a few days, weeks, years, or other predetermined periods. Other examples are possible as well. In this manner, the graphical user interface 500 may illustrate variation in the event scores 504 for the resource over time.

While the event scores 504 are shown to take values between 0 and 0.5, in some embodiments the event scores 504 may take other values as well, and any units are possible for event scores 504. For example, the event score may be given by the lower bound of a binomial confidence interval or may take a quantitative or qualitative value that corresponds to the lower bound of the binomial confidence interval. For example, the event score may take a value along a numeric range, a qualitative value indicating a rating, or a qualitative value indicating a grade, such as an "A-" or "C+." Other event scores are possible as well. In some embodiments, higher event scores may indicate a higher potential that a resource is responsible for an event. Alternatively, in some embodiments, lower event scores may indicate a higher potential that a resource is responsible for an event.

In some embodiments, graphical user interface 500 may automatically flag event scores that, for example, exceed a predetermined threshold and/or increase by more than a predetermined amount, for example, within a predetermined period.

In some embodiments, downstream events 506 may identify actors affected by an event after accessing the resource (e.g., the subset of resource-affected actors, as described above in connection with FIG. 4). In some embodiments, graphical user interface 500 may use the event scores to identify additional actors that may be affected by the event in the future and/or predict future events. For example, in a system for detecting financial card fraud originating at a merchant, graphical user interface 500 may, for example, automatically flag or decline and/or invite a user to decline authorization for future purchases made using a merchant-defrauded financial card on the grounds that such purchase are likely fraudulent purchases. Other examples are possible as well.

In some embodiments, a user of graphical user interface 500 may vary the predetermined periods shown using a zoom tool 508 or other input. In this manner, the user may view, for example, the resource's event score over a longer or shorter predetermined period or periods.

In some embodiments, a user of graphical user interface 500 may wish to view event scores for more than one resource. To this end, the user may, for example, select one or more additional resources 502. For example, the user may select, in addition to "RESOURCE_2," as shown, "RESOURCE_3" or another resource or resources 502. Other examples are possible as well. Alternatively or additionally, the user may, for example, select a category 510 of resources for which to view event scores, as shown in FIG. 5B.

Categories 510 may be generated based on, for example, data describing resource(s) 502. The data may include, for example, data identifying a brand or operator of each resource 502, data identifying a resource type of each resource 502 (e.g., server, database, merchant, service provider, etc.), data identifying a geographic location of each resource 502, data describing any point-of-sale terminals associated with each resource 502 (e.g., geographic location of terminal, terminal manufacturer, terminal hardware, terminal software, etc.), data describing security used by resource(s) 106, and/or data describing a processor used by each resource 502 (e.g., processor operator, processor hardware, processor software, etc.). Other data describing resources 502 is possible as well. Other data are possible as well.

The user may select a category 510 to view event scores for resources 502 within the category 510. For example, the user may select to view event scores for all resources 502 in a particular zip code. As another example, the user may select to view an aggregate event score for all resources 502 of a particular resource type. Other examples are possible as well.

While graphical user interface 500 is shown to include inputs for resources 502 and categories 510, it will be understood that other inputs, permitting the user to view event scores for the plurality of resources in other manners, are possible as well. In general, graphical user interface 500 may permit a user to interactively view illustrations of event scores at resources over predetermined periods. Graphical user interface 500 may permit the user to, for example, estimate gains and/or losses from events, estimate dates on which events may have occurred at resources, identify additional actors that may be affected by an event in the future, and/or predict future activity by affected actors and/or future events. Other examples are possible as well.

Moreover, while the foregoing capabilities were described in connection with a modeling system and graphical user interfaces, it will be understood that other modeling systems, with or without graphical user interfaces, are possible as well. The described capabilities may be carried out in connection with resource detection process 400 in any manner, whether by such a modeling system without a graphical user interface, with different graphical user interfaces, without a modeling system, and/or in any other manner.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while certain resources (e.g., merchant, databases, ATMs, servers, etc.), actors (e.g., customers, financial cards, etc.), and events (e.g., fraud, skimming, breach, changes in customer behavior) have been referred to herein for ease of discussion, it is to be understood that consistent with disclosed embodiments other resources are possible as well.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system for detecting resources responsible for events, comprising:
   a memory storing instructions; and
   a processor configured to execute the instructions to perform operations comprising:
   receiving data associated with a resource;
   identifying, in real-time as the data associated with the resource is received, a plurality of first actors that have accessed the resource by applying a Bloom filter to the data associated with the resource;

determining a number of unique actors from the first actors;

identifying from the unique actors, a set of affected actors that have been affected by an event;

identifying, from the set of affected actors, a subset of resource-affected actors comprising affected actors that accessed the resource prior to being affected by the event;

determining a number of resource-affected actors in the subset of resource-affected actors by calculating a weighted sum of the subset of resource-affected actors, weighted according to a proportion of a number of accesses made by each of the resource-affected actors at the resource;

determining an event score for the resource based on the number of unique actors and the number of resource-affected actors, wherein the event score comprises a lower bound of a confidence interval of a binomial proportion of the number of resource-affected actors to the number of unique actors;

determining an aggregated event score for at least one unique actor that accessed the resource, based on the event score for the resource and at least a second event score for a second resource accessed by the at least one unique actor;

flagging the at least one unique actor when their aggregated event score exceeds a predetermined threshold; and declining any incoming purchases by the at least one unique actor whose aggregated event score exceeds the predetermined threshold.

2. The system of claim 1, wherein the confidence interval comprises a Clopper-Pearson interval.

3. The system of claim 1, wherein the confidence interval comprises a Wald Interval.

4. The system of claim 1, wherein:
the resource comprises a database;
the first actors comprise a plurality of accounts; and
the event comprises a database breach.

5. The system of claim 1, wherein:
the resource comprises a system associated with a merchant;
the first actors comprise a plurality of financial cards; and
the event comprises a fraudulent transaction.

6. The system of claim 1 further comprising the event score to a modeling system to generate a graphical user interface comprising at least a representation based on the event score.

7. A non-transitory computer-readable medium storing instructions that, when executed by a processor, cause the processor to perform operations comprising:
receiving data associated with a resource;
identifying, in real-time as the data associated with the resource is received, a plurality of first actors that have accessed the resource by applying a Bloom filter to the data associated with the resource;

determining a number of unique actors from the first actors;

identifying from the unique actors, a set of affected actors that have been affected by an event;

identifying, from the set of affected actors, a subset of resource-affected actors comprising affected actors that accessed the resource prior to being affected by the event;

determining a number of resource-affected actors in the subset of resource-affected actors by calculating a weighted sum of the subset of resource-affected actors, weighted according to a proportion of a number of accesses made by each of the resource-affected actors at the resource;

determining an event score for the resource based on the number of unique actors and the number of resource-affected actors, wherein the event score comprises a lower bound of a confidence interval of a binomial proportion of the number of resource-affected actors to the number of unique actors; and determining an aggregated event score for at least one unique actor that accessed the resource, based on the event score for the resource and at least a second event score for a second resource accessed by the at least one unique actor;

flagging the at least one unique actor when their aggregated event score exceeds a predetermined threshold; and declining any incoming purchases by the at least one unique actor whose aggregated event score exceeds the predetermined threshold.

8. The non-transitory computer-readable medium of claim 7, wherein the confidence interval comprises a Clopper-Pearson interval.

9. The non-transitory computer-readable medium of claim 7, wherein the confidence interval comprises a Wald Interval.

10. The non-transitory computer-readable medium of claim 7, wherein:
the resource comprises a database;
the first actors comprise a plurality of accounts; and
the event comprises a database breach.

11. The non-transitory computer-readable medium of claim 7, wherein:
the resource comprises a system associated with a merchant;
the first actors comprise a plurality of financial cards; and
the event comprises a fraudulent transaction.

12. The non-transitory computer-readable medium of claim 7, further comprising providing the event score to a modeling system to generate a graphical user interface comprising at least a representation based on the event score.

* * * * *